(12) United States Patent
Lan et al.

(10) Patent No.: US 8,138,549 B2
(45) Date of Patent: Mar. 20, 2012

(54) SYSTEM FOR DISPLAYING IMAGES

(75) Inventors: Jung-Huang Lan, Chiayi (TW);
Yih-Shing Lee, Hsinchu (TW);
Cheng-Hsin Chen, Changhua County
(TW); Hsxg-Ju Sung, Keelung (TW)

(73) Assignee: Chimei Innolux Corporation, Miao-Li County (TW)

( * ) Notice: Subject to any disclaimer, the term of this patent is extended or adjusted under 35 U.S.C. 154(b) by 1234 days.

(21) Appl. No.: 11/622,664

(22) Filed: Jan. 12, 2007

(65) Prior Publication Data

US 2008/0170190 A1    Jul. 17, 2008

(51) Int. Cl.
*H01L 23/62*    (2006.01)
(52) U.S. Cl. ............ 257/355; 257/173; 257/E23.1; 257/E23.141; 257/E23.066; 349/122
(58) Field of Classification Search ............ 257/173, 257/355, E23.1, E23.141, E23.066; 349/122
See application file for complete search history.

(56) References Cited

U.S. PATENT DOCUMENTS
7,638,939 B2 * 12/2009 Ishiguro et al. ............ 313/504

FOREIGN PATENT DOCUMENTS
JP    2005049738 A  *  2/2005

* cited by examiner

*Primary Examiner* — Jarrett Stark
(74) *Attorney, Agent, or Firm* — Thomas|Kayden (57) ABSTRACT

A system for displaying images is disclosed. A display panel comprises a first substrate and a second substrate with a liquid crystal layer interposed therebetween. A sealant is interposed between the first substrate and a second substrate for sealing the liquid crystal layer. A dielectric layer is overlying the first substrate. Metal lines are overlying the dielectric layer under and/or near the sealant. A planarization layer covers and contacts the dielectric layer and the metal lines to form a first interface between the metal lines and the planarization layer and a second interface between the dielectric layer and the planarization layer. Bridge lines without contacting the planarization layer are disposed under and/or near the sealant, instead of at least a portion of the metal lines contacting the planarization layer.

8 Claims, 14 Drawing Sheets

SYSTEM FOR DISPLAYING IMAGES

BACKGROUND OF THE INVENTION

1. Field of the Invention

The invention relates to a display device, and more particularly to a liquid crystal display device.

2. Description of the Related Art

Liquid crystal displays (LCD) have become widely used, with a working principle based on alignment alteration of liquid crystal molecules by application of an electrical field so as to change the path of light passing therethrough. Typically, an LCD includes two opposite substrates with a gap therebetween containing liquid crystal. Both substrates are formed with electrodes to control orientation and arrangement of liquid crystals. Images are displayed on the LCD panel by controlling orientation of liquid crystals with electrical field, in which bright dots or dark dots are generated where the light passes or is blocked.

Figure 1:
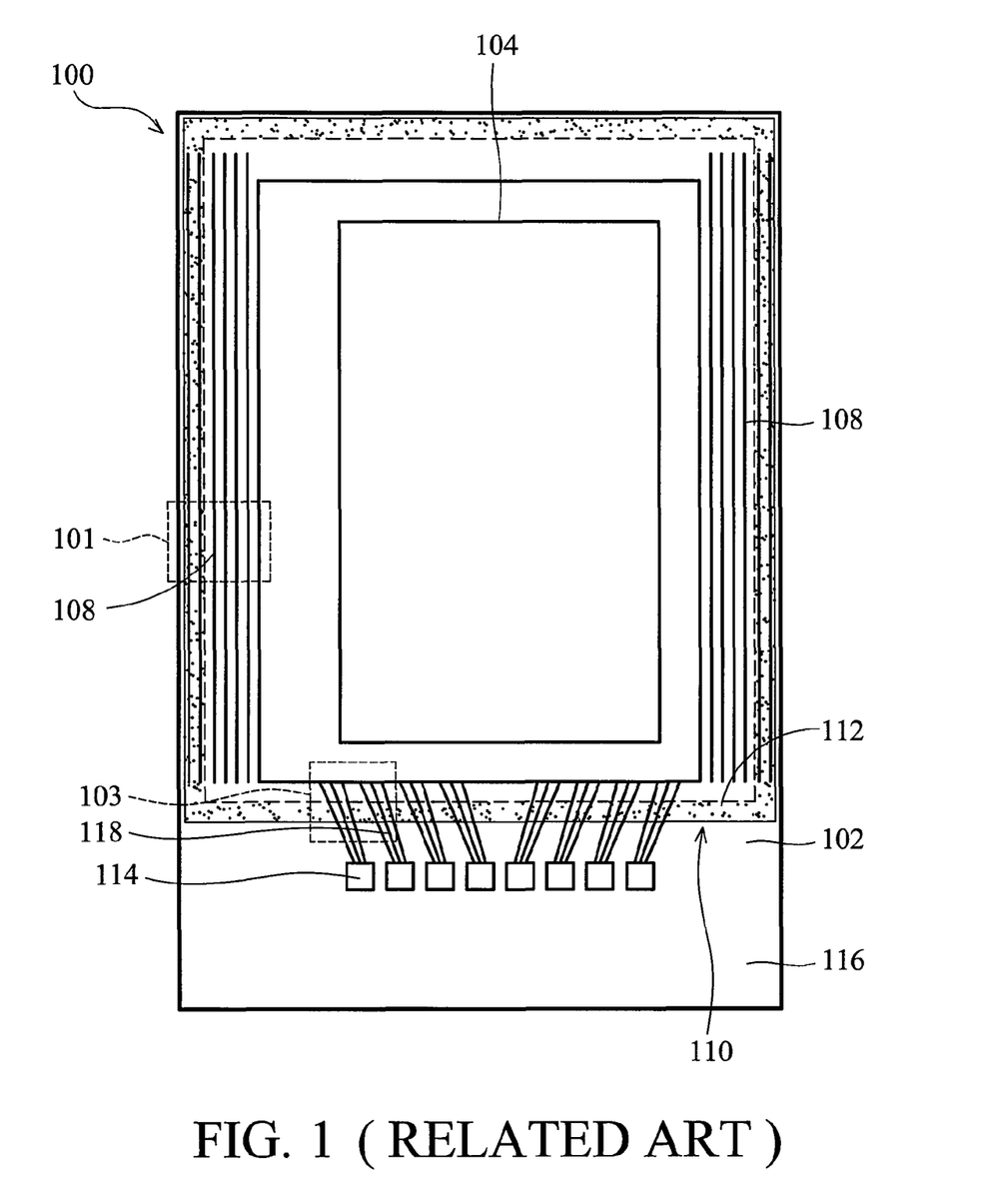
FIG. 1 is a plan view of a conventional liquid crystal display panel.

FIG. 1 is a plan view of a conventional display panel 100. Referring to FIG. 1, an array substrate 102 comprising an array region 104 is provided.

A plurality of first signal lines 108 are disposed on the periphery of the array substrate 102. Most of the first signal lines 108 are parallel to the edge of the array substrate 102, providing signals or power to the driving circuits of the display panel 100.

The array substrate 102 and a second substrate 110 are sealed by a sealant 112 (the dot area in FIG. 1), disposed at the periphery of the array substrate 102 and the second substrate 110. Liquid crystals are injected into the space between the array substrate 102 and the second substrate 110. A plurality of driving ICs 114 are disposed on an extending area 116 of the array substrate 102 beyond the overlapping area of the second substrate 110 and the array substrate 102. A plurality of second signal lines 118 are arranged in a fan shape to supply signals or power from the driving ICs 114 to the driving circuits.

Figure 2A:
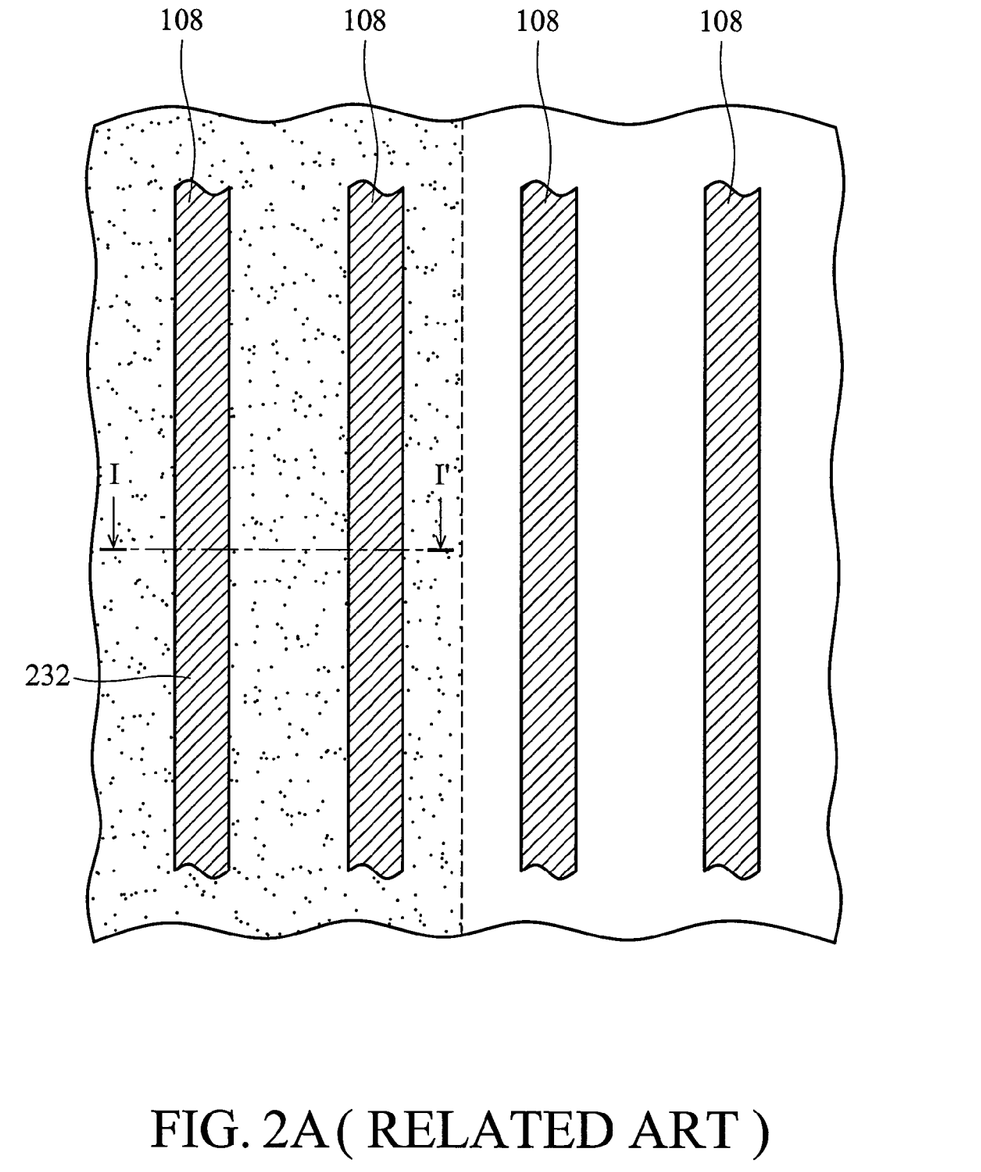
FIG. 2A is an enlarged view of a region of FIG. 1.
Figure 2B:
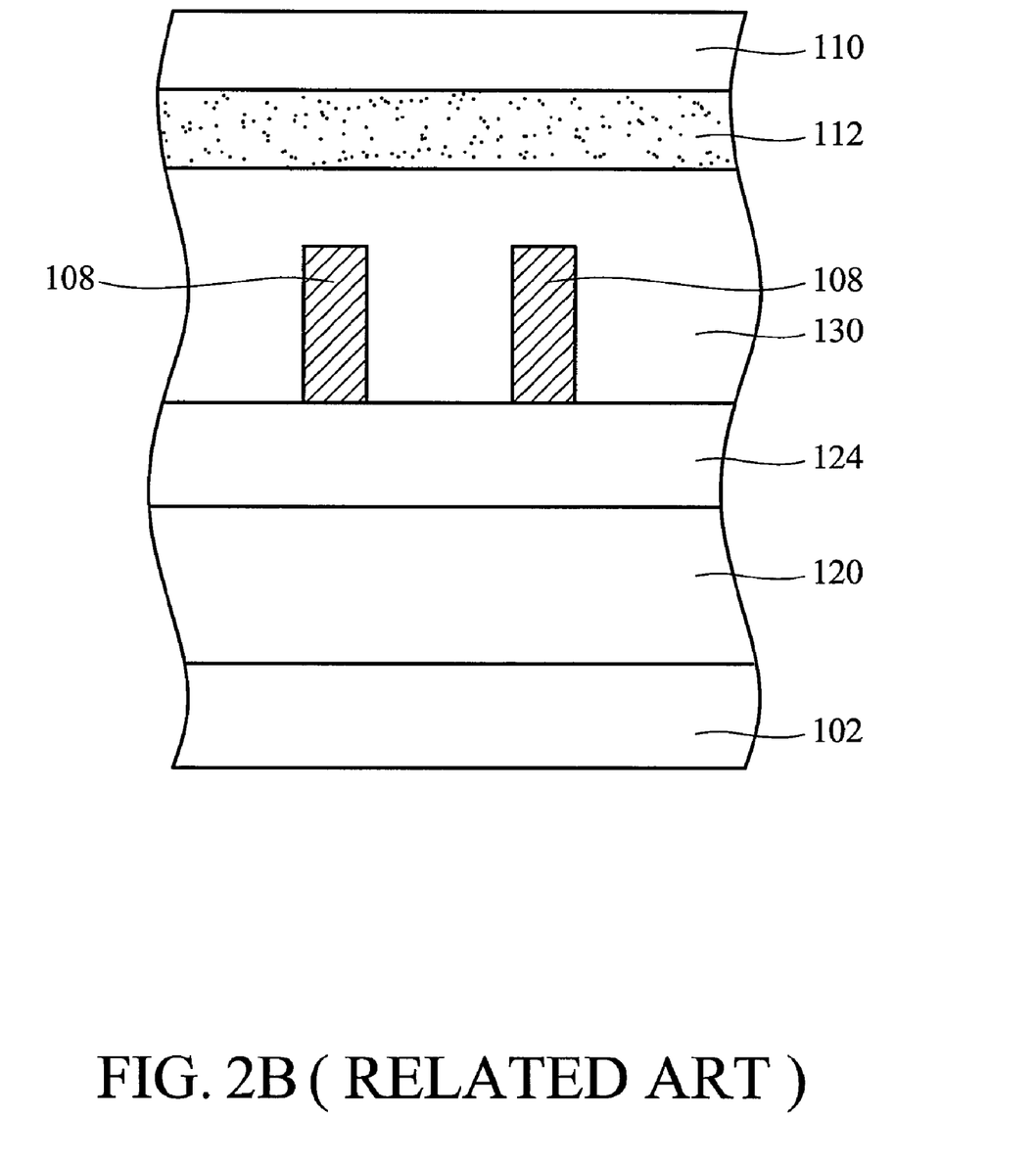
FIG. 2B is a cross section along line I-I' of FIG. 2A.

FIG. 2A is an enlarged view of region 101 in FIG. 1. FIG. 2B is a cross section along line I-I' of FIG. 2A. Referring to FIG. 2A and FIG. 2B, a first dielectric layer 120 is formed on the array substrate 102. An interlayer dielectric layer 124 is formed on the first dielectric layer 120. The first signals lines 108 parallel to the edge of the array substrate 102 are metal lines, such as Mo, Al or combinations thereof or stacked layers thereof. Typically, in a low temperature polysilicon thin film transistor liquid crystal display device, a planarization layer 130 is formed on the metal line 108 and the interlayer dielectric layer 124. A sealant 112 is formed on the planarization layer 130 for sealing the second substrate 110.

Figure 3A:
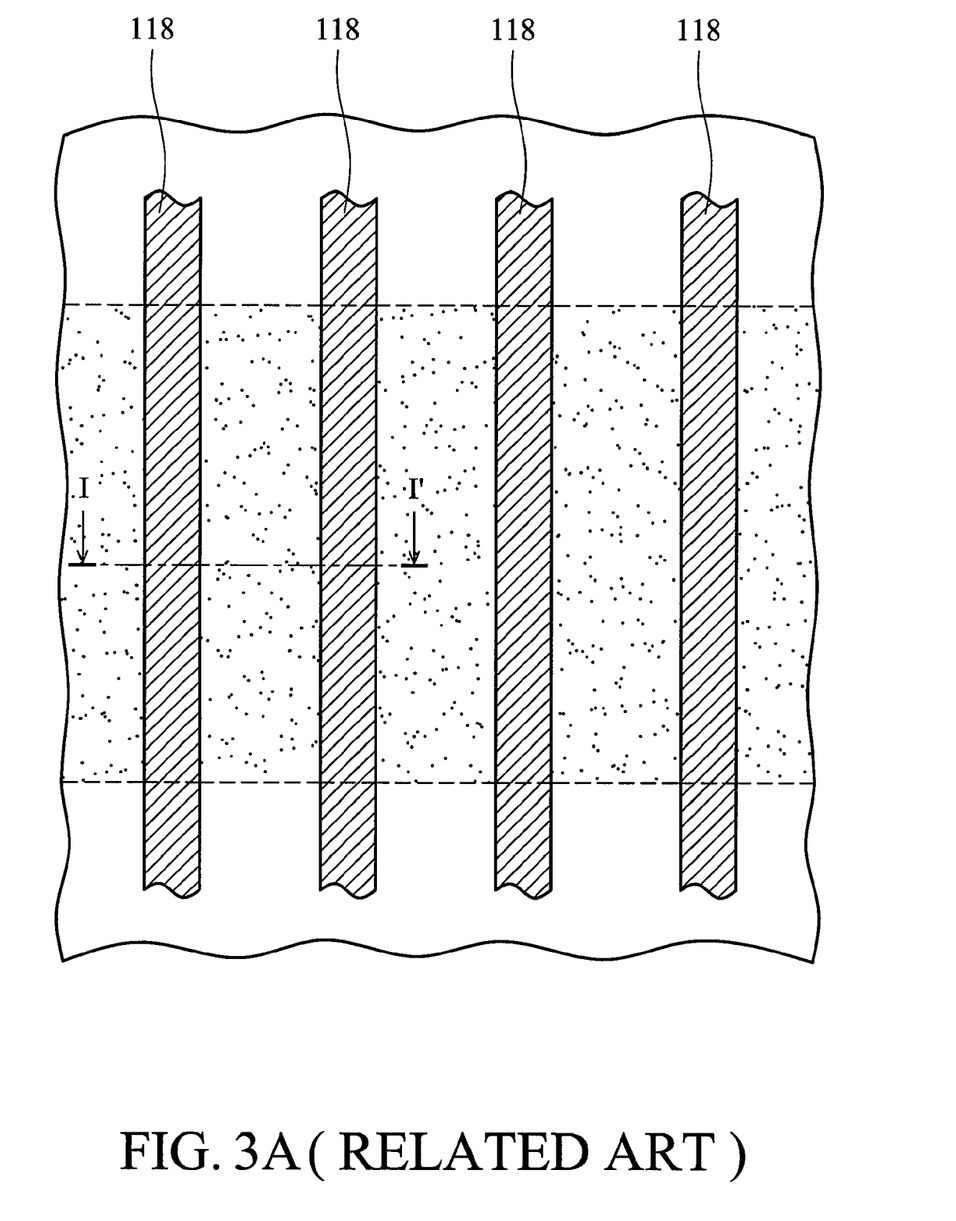
FIG. 3A is an enlarged view of another region of FIG. 1.
Figure 3B:
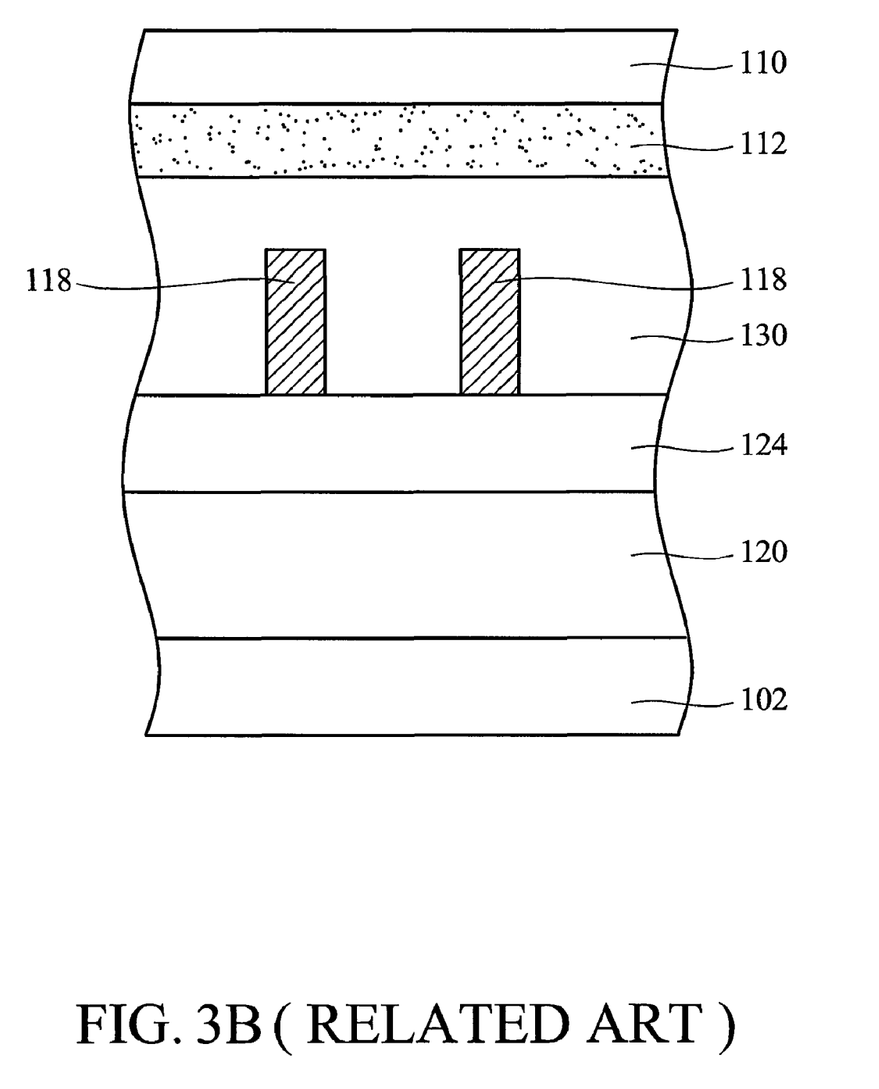
FIG. 3B is a cross section along line I-I' of FIG. 3A.

FIG. 3A is an enlarged view of region 103 in FIG. 1. FIG. 3B is a cross section along line I-I' of FIG. 3A. Referring to FIG. 3A and FIG. 3B, the second signals lines 118 supplying signals or power from the driving ICs 114 to the driving circuits are metal lines, such as Mo, Al or combinations thereof or stacked layers thereof. Typically, in a low temperature polysilicon thin film transistor liquid crystal display device, a planarization layer 130 is formed on the second signal lines 118 and the interlayer dielectric layer 124.

Adhesion between the metal lines 118 and 108 and the planarization layer 130 is worse than that between the interlayer dielectric layer 124 and the polarization layer 130. Consequently, peeling is likely to occur at the interface between the metal lines 118 or 108 and the planarization layer 130 when the display panel 100 is impacted. Thus, liquid crystals between the array substrate 116 and the second substrate 110 easily leak.

BRIEF SUMMARY OF THE INVENTION

A detailed description is given in the following embodiments with reference to the accompanying drawings. These and other problems are generally solved or circumvented, and technical advantages are generally achieved, by preferred illustrative embodiments of the present invention, which provide a system for displaying images.

In an embodiment of the invention, a system for displaying images comprising a display device is disclosed. A first substrate and a second substrate with a liquid crystal layer interposed therebetween are provided. A sealant is interposed between the first substrate and a second substrate for sealing the liquid crystal layer. A dielectric layer is overlying the first substrate. Metal lines are overlying the dielectric layer under and/or near the sealant. A planarization layer covers and contacts the dielectric layer and the metal lines to form a first interface between the metal lines and the planarization layer and a second interface between the dielectric layer and the planarization layer. Bridge lines without contacting the planarization layer are disposed under and/or near the sealant, instead of at least a portion of the metal lines contacting the planarization layer.

The invention further provides a system for displaying images comprising a display device. A first substrate and a second substrate with a liquid crystal layer interposed therebetween are provided. A sealant is between the first substrate and a second substrate for sealing the liquid crystal layer. A dielectric layer is disposed overlying the first substrate. Dummy metal patterns are disposed overlying the dielectric layer under and/or near the sealant. A planarization layer covers and contacts the dielectric layer and the dummy metal patterns to form a first interface between the dummy metal patterns and the planarization layer and a second interface between the dielectric layer and the planarization layer. A ratio of an area of the first interface to an area of the second interface is substantially less than 75%.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims. Embodiments of the invention, which provides a liquid crystal display device, will be described in greater detail by referring to the drawings that accompany the invention. It is noted that in the accompanying drawings, like and/or corresponding elements are referred to by like reference numerals.

Figure 4:
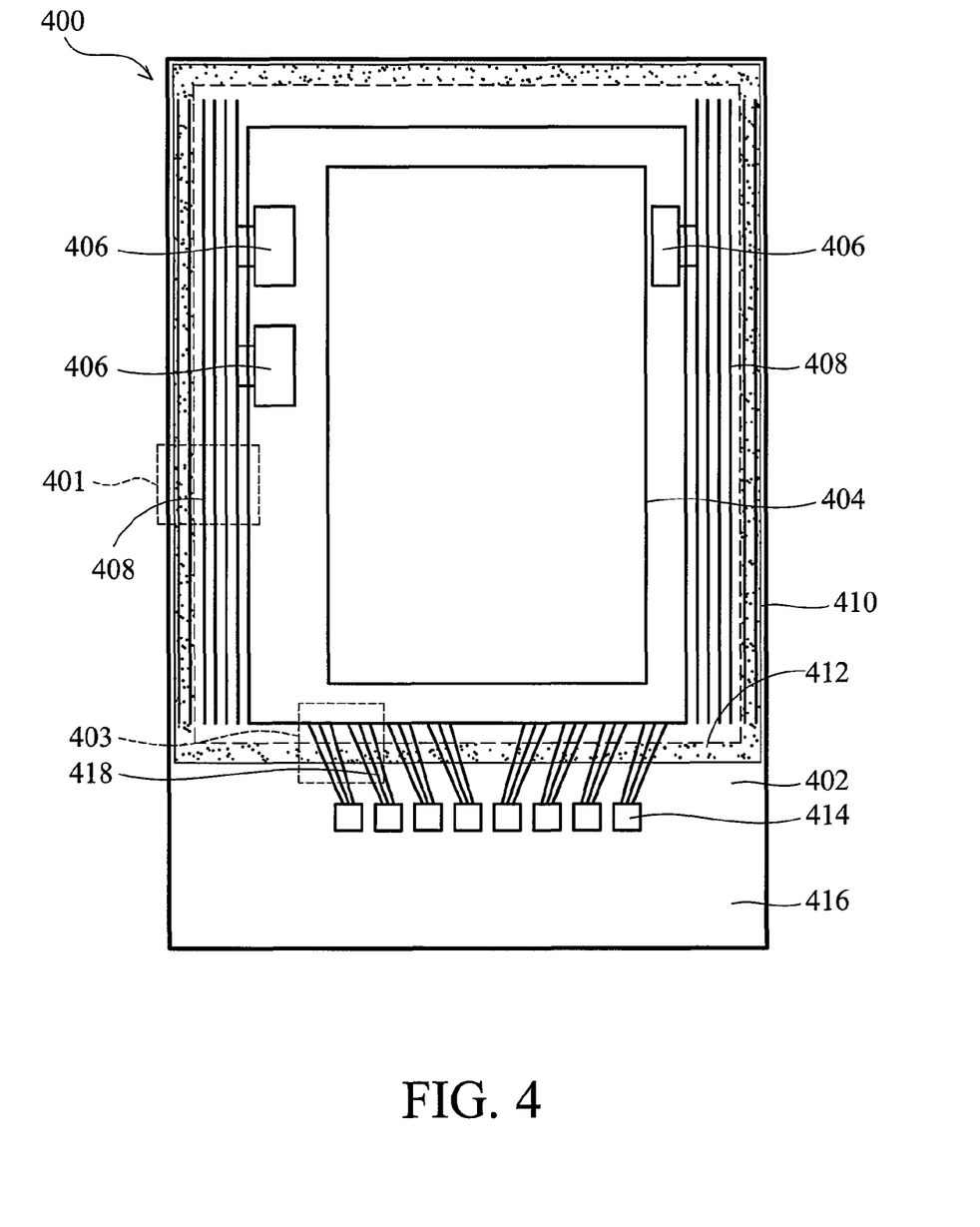
FIG. 4 is a plan view of a system for display images of an embodiment of the invention.

FIG. 4 is a plan view of a system for displaying images, such as a display panel 400, of an embodiment of the invention. Referring to FIG. 4, a first substrate, such as an array substrate 402 is provided. The array substrate 402 comprises an array region 404 comprising a plurality of pixels, thin film transistors, gate lines and data lines (not shown). Beyond the array region 404, the array substrate 402 further comprises a plurality of driving regions 406 comprising a plurality of driving circuits, driving the display panel 400.

Beyond the array region 404 and the driving region 406, a plurality of first signal lines are disposed on the periphery of the array substrate 402. Most of the first signal lines 408 are parallel to the edge of the array substrate 402, providing signals or power to the driving circuits in the driving regions 406.

The array substrate 402 and a second substrate, such as a second substrate 410, are sealed by a sealant 412 for sealing a liquid crystal layer between the array substrate 402 and the second substrate 410, wherein the sealant 412 is at the periphery of the array substrate 402 and the second substrate 410. In an embodiment of the invention, the sealant 412 is disposed beyond the array region 404 and the driving region 406.

A plurality of driving ICs 414 are disposed in an extended area 416 of the array substrate 402 beyond the overlapping area of the second substrate 410 and the array substrate 402. A plurality of second signal lines 418 are arranged in a fan shape to supply signals or power from the driving ICs 414 to the driving circuits in the driving region with a region comprising the second signal lines arranged in a fan shape can be referred to as a fan out region.

Figure 5A:
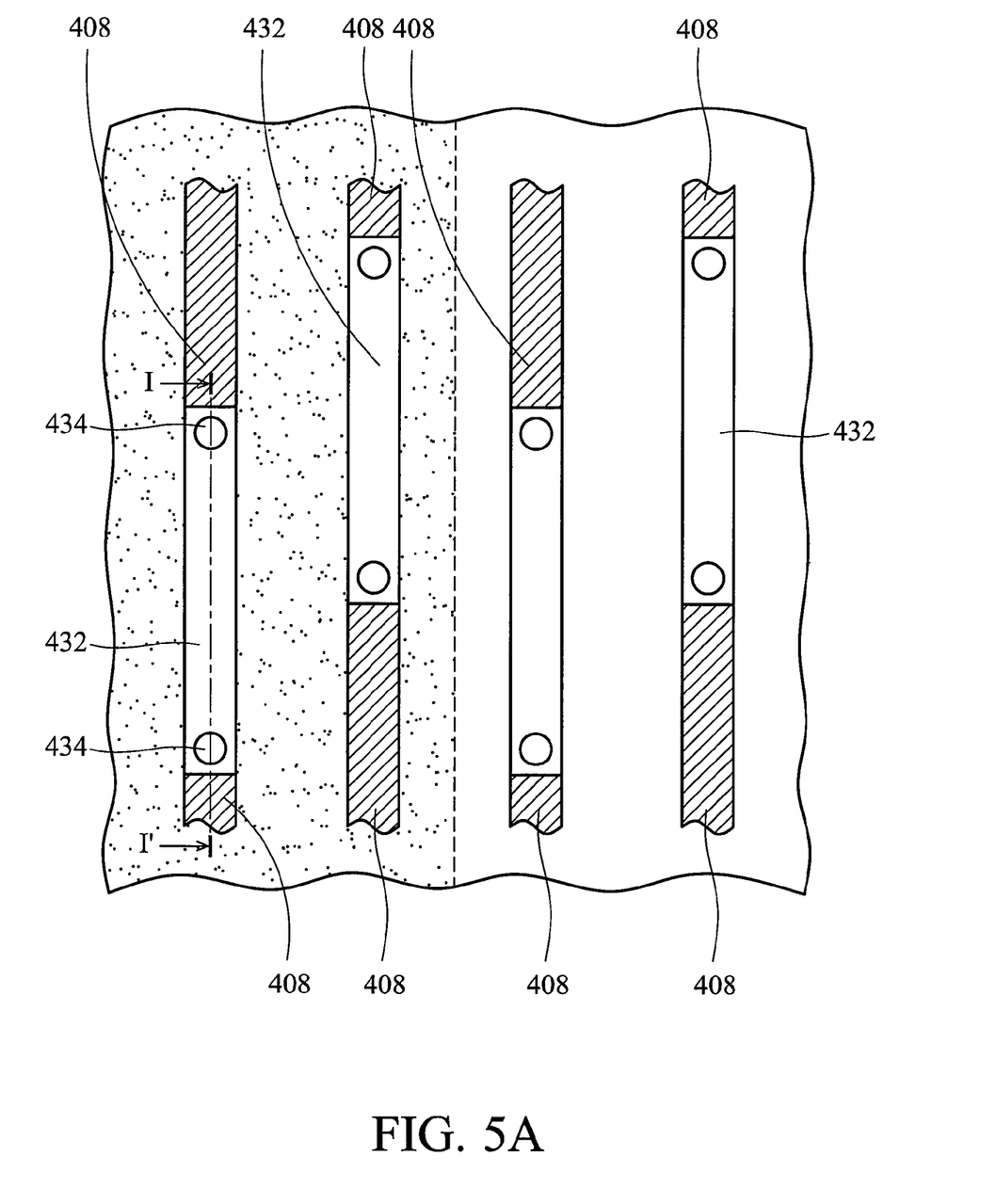
FIG. 5A is an enlarged view of a region of FIG. 4.
Figure 5B:
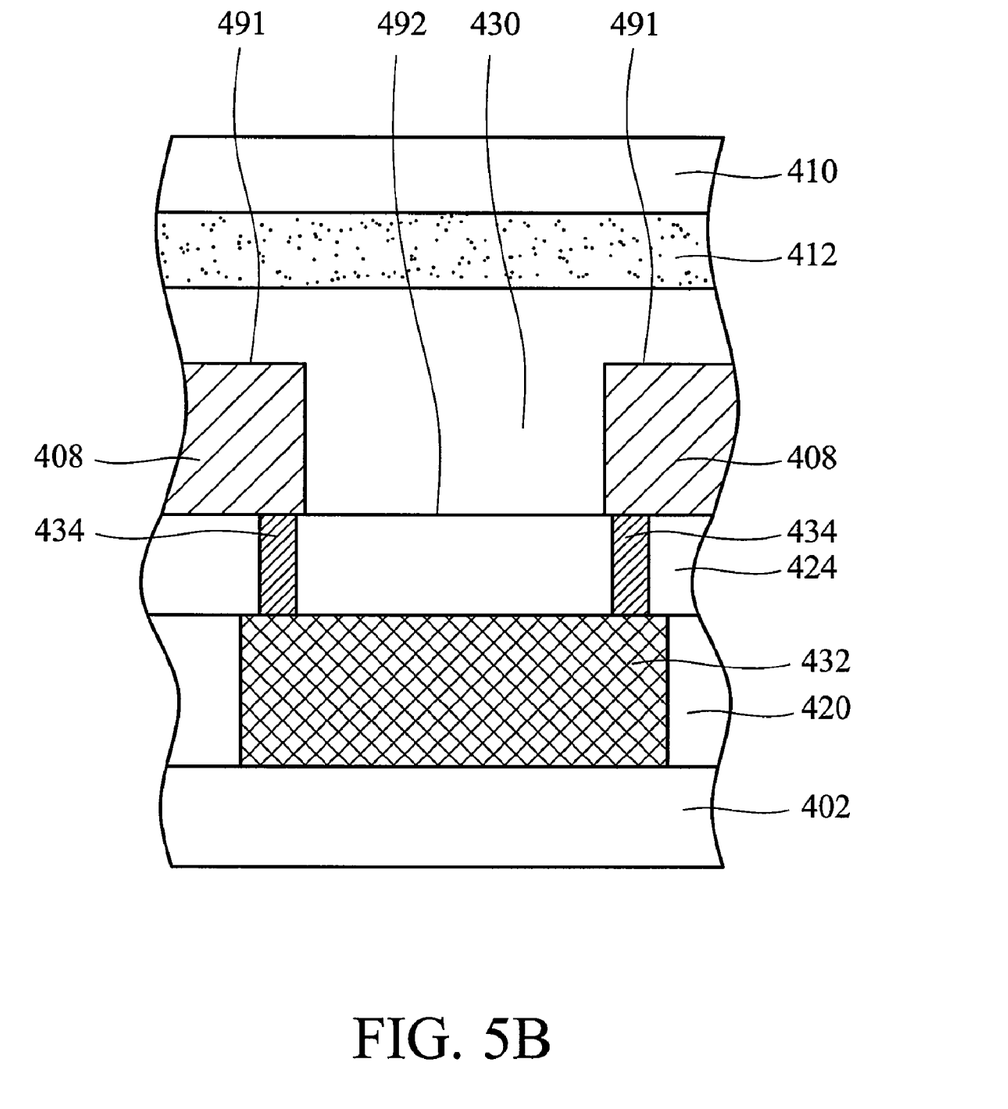
FIG. 5B is a cross section along line I-I' of FIG. 5A.

FIG. 5A is an enlarged view of region 401 in FIG. 4. FIG. 5B is a cross section along line I-I' of FIG. 5A. Referring to FIG. 5A and FIG. 5B, a first dielectric layer 420, such as silicon oxide, silicon nitride or silicon oxynitride, is formed on the array substrate 402. An interlayer dielectric layer 424, such as silicon oxide, silicon nitride or silicon oxynitride, is formed on the first dielectric layer 420. The first signals lines 408 are metal lines, such as Mo, Al or combinations thereof or stacked layers thereof, on the interlayer dielectric layer 424. Typically, in a low temperature polysilicon thin film transistor liquid crystal display device, a planarization layer 430, such as an organic layer, is formed covering and contacting the metal lines 408 and the interlayer dielectric layer 424 to form a first interface 491 between the metal lines 408 and the planarization layer 430 and a second interface 492 between the interlayer dielectric layer 424 and the planarization layer 430. A sealant 412 is formed on the planarization layer 430 for sealing a liquid crystal layer between the second substrate 410 and the array substrate 402.

In a peeling test, peeling is likely to occur at the interface 491 between the first signal lines 408 and the planarization layer 430. In order to reduce peeling, a structure for reducing the contact area of the first signal lines 408 and the planarization layer 430 is disclosed.

In an embodiment of the invention, in order to reduce contact area of the first signal lines 408 (metal lines) and the planarization layer 430, bridge lines 432 without contacting the planarization layer 430 are disposed under and/or near the sealant 412, instead of at least a portion of the first signal lines 408 contacting the planarization layer 430. The bridge lines 432 and the gate lines (not shown) are simultaneously formed by using a process.

As well, some of the first signal lines 408 directly underlying the sealant 412 and the planarization layer 430 are cut, and then serially connected by the bridge lines 432 underlying the metal lines 408 through vias 434 in the interlayer dielectric layer 424. Resistance of the bridge lines 432 may be about ten times that of the metal lines. Compared to high resistance of switches of the display device, the resistance of the bridge lines 432 is acceptable.

Figure 6A:
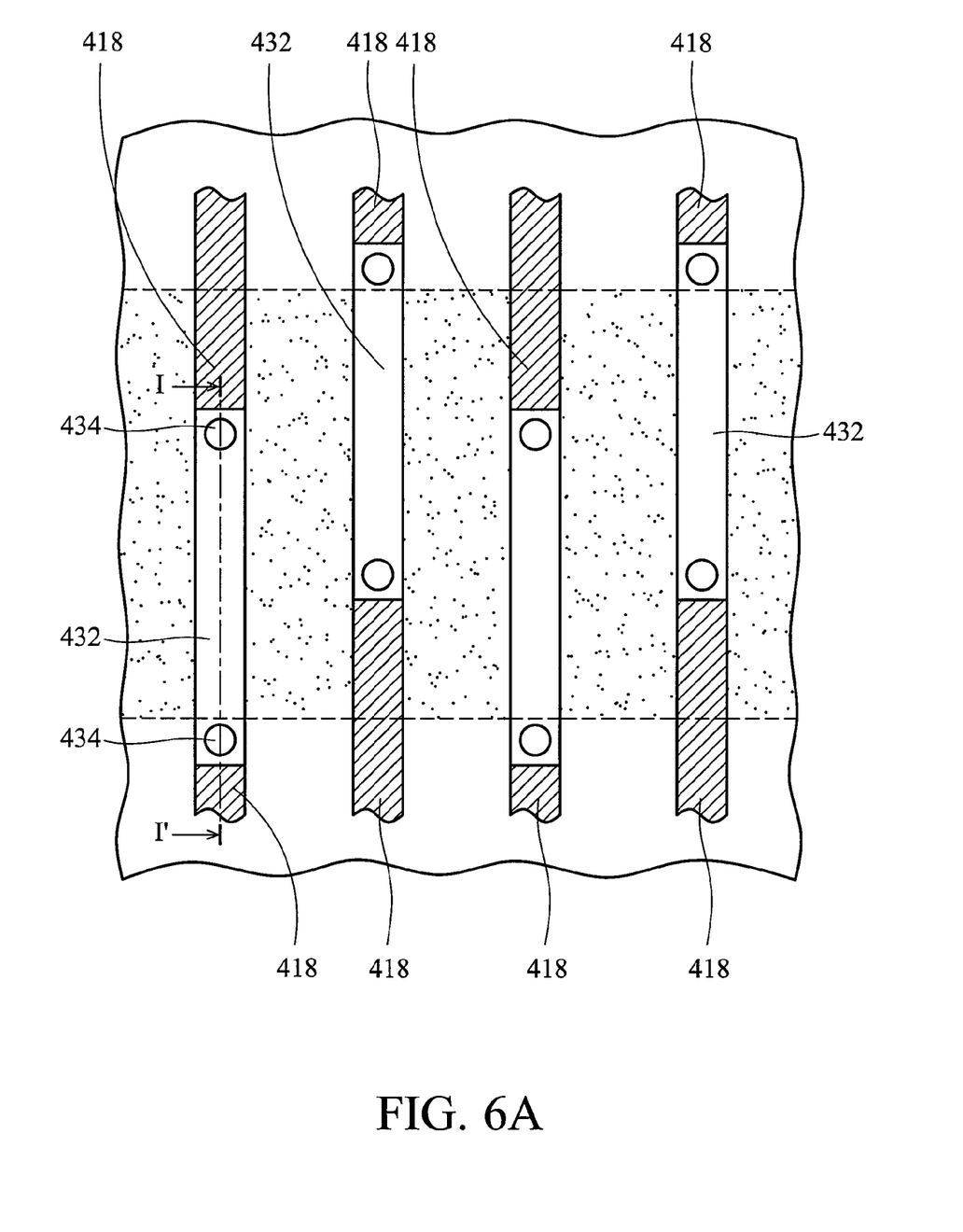
FIG. 6A is another enlarged view of a region of FIG. 4.
Figure 6B:
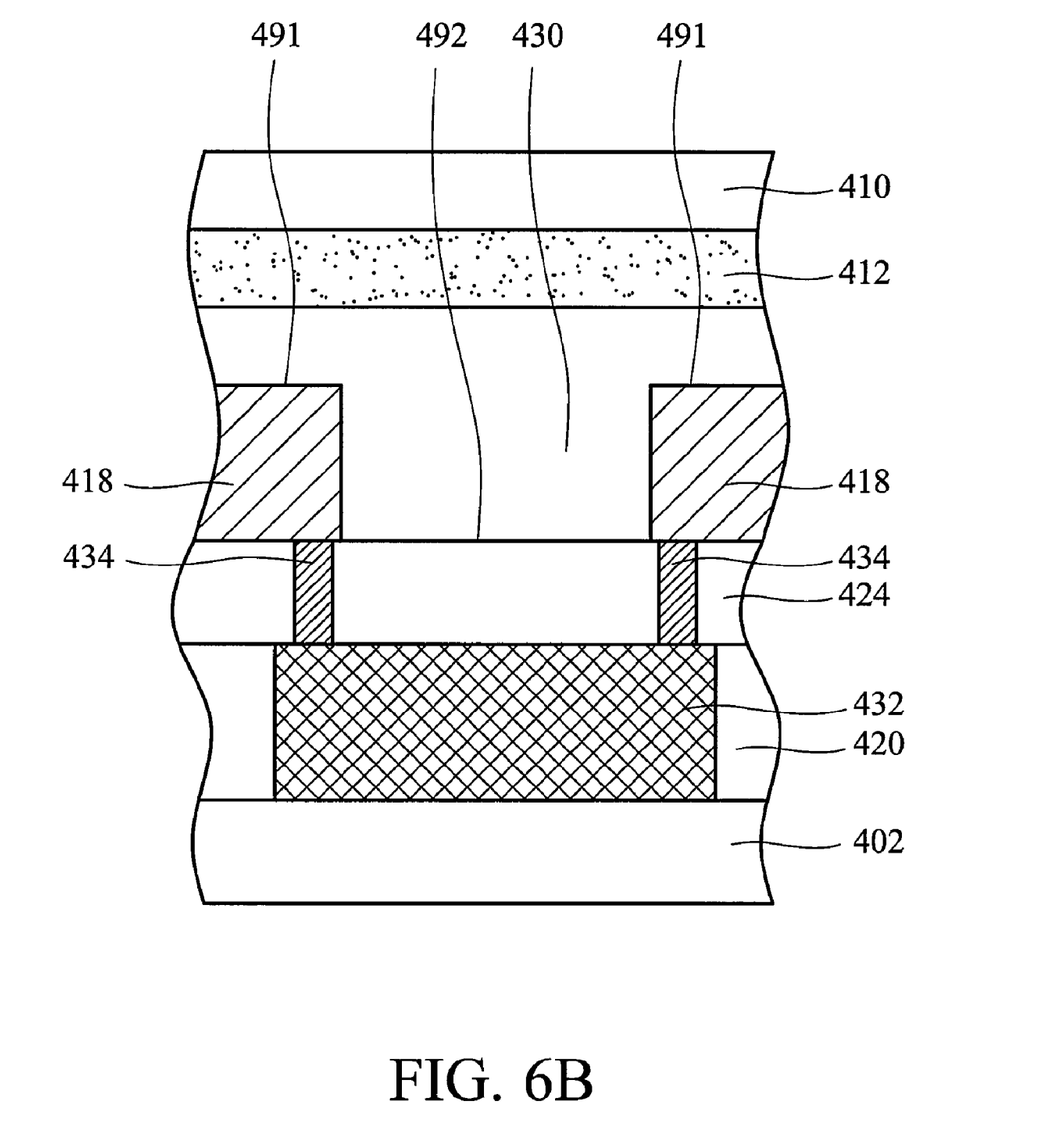
FIG. 6B is a cross section along line I-I' of FIG. 6A.

FIG. 6A is an enlarged view of region 403 in FIG. 4. FIG. 6B is a cross section along line I-I' of FIG. 6A. Referring to FIG. 6A and FIG. 6B, in an embodiment of the invention, to reduce contact area of the second signal lines 418 and the planarization layer 430, bridge lines 432 without contacting the planarization layer 430 are disposed under and/or near the sealant 412, instead of at least a portion of the second signal lines 418 contacting the planarization layer 430. In FIG. 6B, some of the second signal lines 418 underlying the sealant 412 and the planarization layer 430 are cut, and then serially connected by the bridge lines 432 underlying second signal lines 418 through vias 434 within the interlayer dielectric layer 424.

According the embodiment, the contact area of the planarization layer 430 and the metal lines 408 and/or 418 is reduced. Thus, peeling from poor adhesion of the planarization layer 430 and the metal lines 408 and/or 418 could be eliminated, and liquid crystal leakage reduced when the display panel compacts.

Figure 7:
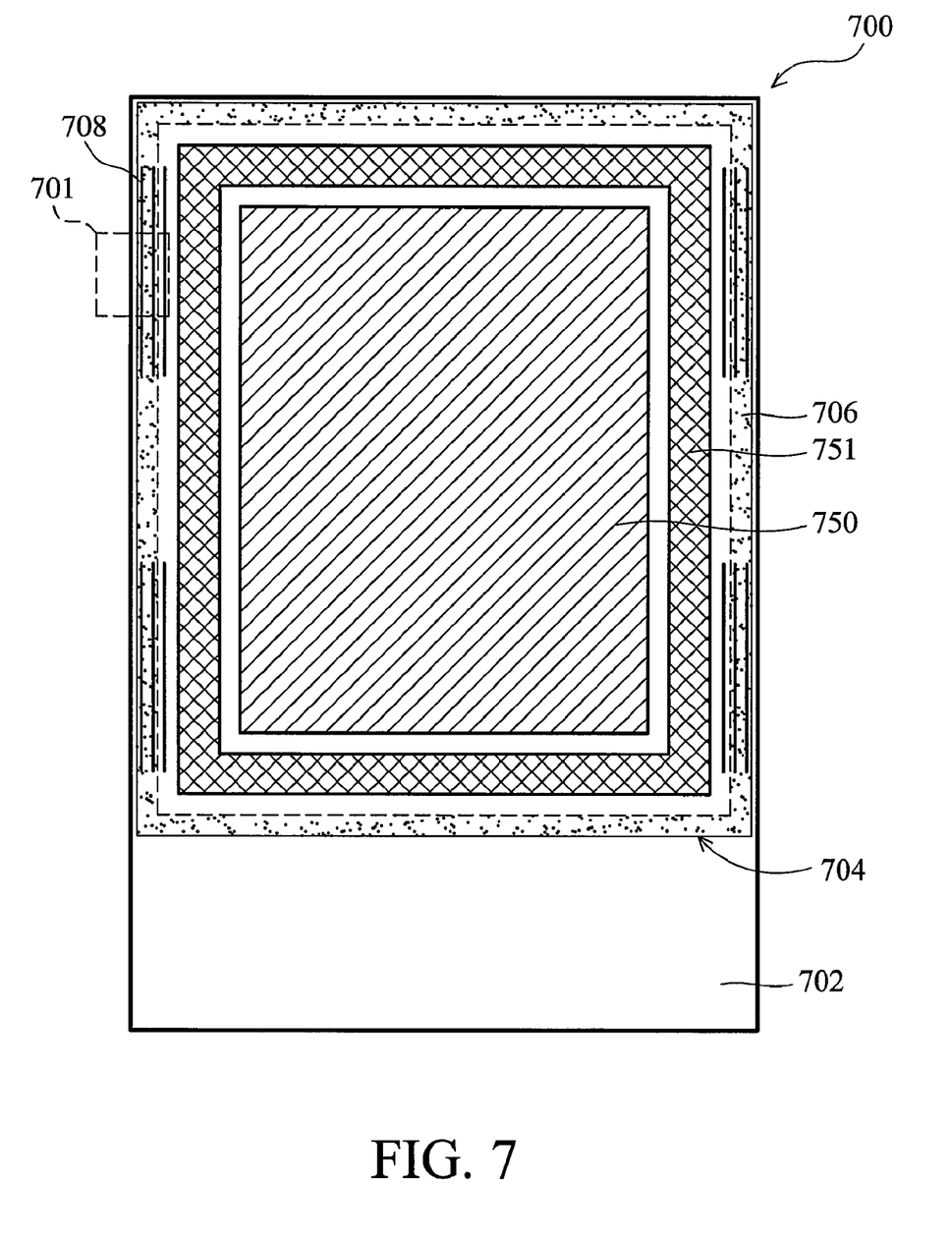
FIG. 7 is a plan view of a system for display images of another embodiment of the invention.

FIG. 7 is a plan view of a system for displaying images, such as a display panel 700, of another embodiment of the invention. Referring to FIG. 7, an array substrate 702 is provided. The array substrate 702 comprises an array region 750 comprising a plurality of pixels, thin film transistors, gate lines and data lines (not shown). Beyond the array region, the array substrate further comprises a driving region 751 comprising a plurality of the driving circuits for driving display of the display panel.

A sealant 706 (the dot area in FIG. 7) between the array substrate 702 and a second substrate 704 for sealing a liquid crystal layer (not shown). The sealant 706 is disposed at the periphery of the array substrate 702 and the second substrate 704. In an embodiment of the invention, the sealant 706 is disposed at the periphery of the array substrate and in the region beyond the array region 750 and the driving region 751.

Figure 8A:
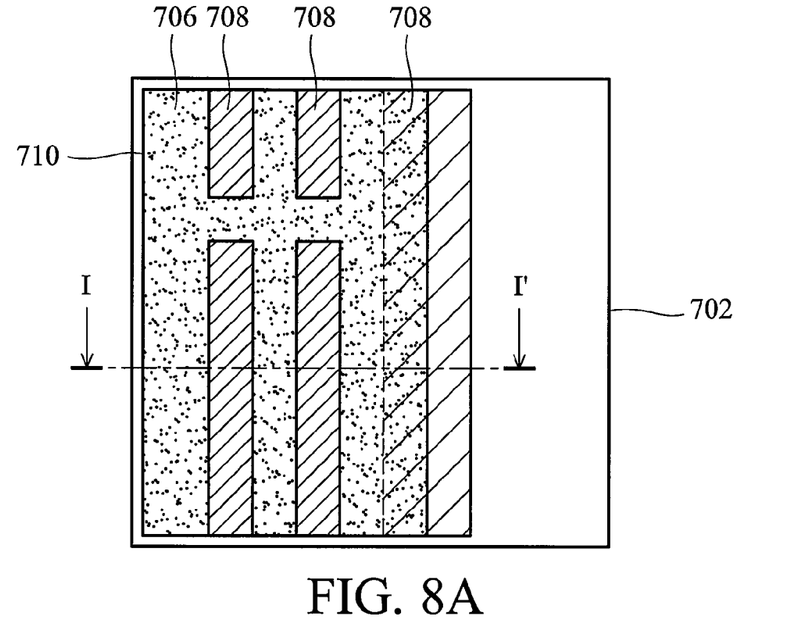
FIG. 8A is an enlarged view of a region of FIG. 7 of an embodiment of the invention.
Figure 8B:
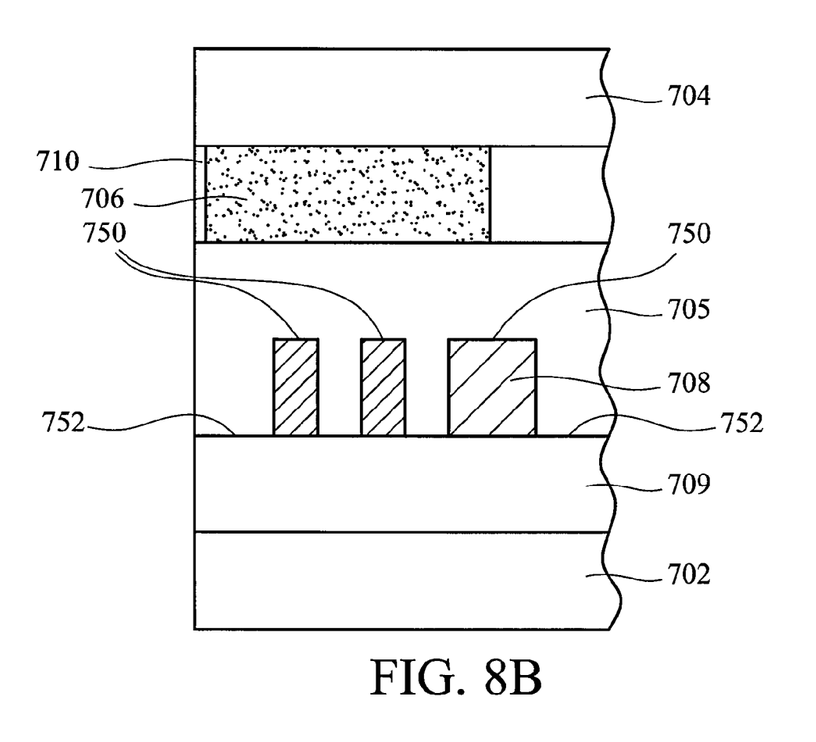
FIG. 8B is a cross section along line I-I' of FIG. 4B.

FIG. 8A is an enlarged view of region 701 of FIG. 7 of an embodiment of the invention. FIG. 8B is a cross section along line I-I' of FIG. 7. Referring to FIG. 8A and FIG. 8B, a plurality of dummy metal patterns 708 can be strips, such as Al, Mo, the combinations thereof or stacked layers thereof, are disposed on a dielectric layer 709 at the periphery of the array substrate 702 to achieve uniform cell gap of the display panel. A planarization layer 705 covers and contacts the dielectric layer 709 and the dummy metal patterns 708 to form a first interface 750 between the dummy metal patterns 708 and the planarization layer 705, and a second interface 752 between the dielectric layer 709 and the planarization layer 705. The dummy metal patterns 708, however, adhere more poorly to the planarization layer 705 than the dielectric layer 709, such as silicon oxide or silicon nitride.

The second interface 752 between the dielectric layer 709 and the planarization layer 705 is at least formed under an outer edge 710 of the sealant 706. In an embodiment, a width of the second interface 752 between the dielectric layer 709 and the planarization layer 705 under the outer edge of the sealant 706 is at least about 3 µm. Further, the first interface 750 between the dummy metal patterns 708 and the planarization layer 705 is not formed under an entire outer edge 710 of the sealant 706. In another embodiment, the dummy metal patterns 708 and the data lines (not shown) are simultaneously formed by using a single process.

In order to eliminate peeling between the planarization layer 705 and the dummy metal patterns 708, the area or size of the dummy metal patterns 708 must be reduced. According to various embodiment of the invention, in a region 701 directly underlying the sealant 706, a ratio of an area of the first interface 750 to an area of the second interface 752 is substantially less than 75%. In another embodiment of the invention, no dummy metal patterns are disposed under the sealant 706 to avoid peeling.

Figure 9:
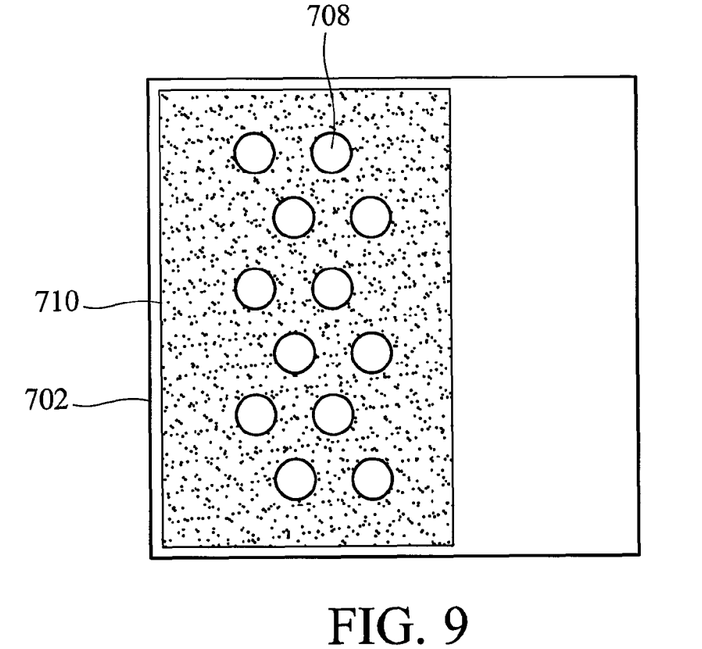
FIG. 9 is an enlarged view of a display panel of another embodiment of the invention.
Figure 10:
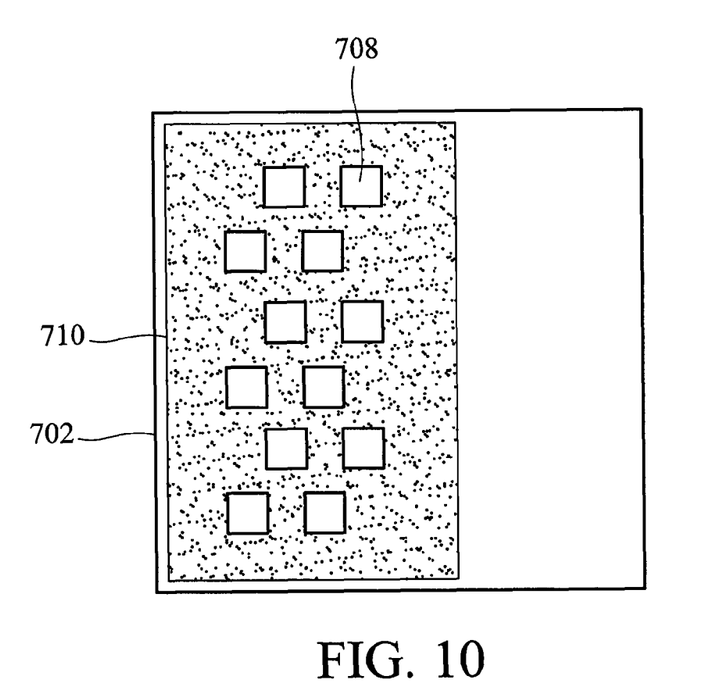
FIG. 10 is an enlarged view of region of further another embodiment of the invention.

FIG. 9 is an enlarged view of region 701 of FIG. 7A of another embodiment of the invention. As shown in FIG. 9, the dummy metal patterns 708 can be circular and small, for example, with a diameter of 10 µm. FIG. 10 is an enlarged view of region 701 of FIG. 7 of another embodiment of the invention. As shown in FIG. 10, the dummy metal patterns 708 can be square and small, for example, with one side of 10 µm length. The invention, however, is not limited thereto. The dummy metal patterns can be any shape.

Accordingly, due to size reduce or position arrangement of the dummy metal pattern, peeling from bad adhesion of the planarization layer and the dummy metal pattern could be eliminated, and liquid crystal leakage problem could also be reduced when the display panel is compacted.

Figure 11:
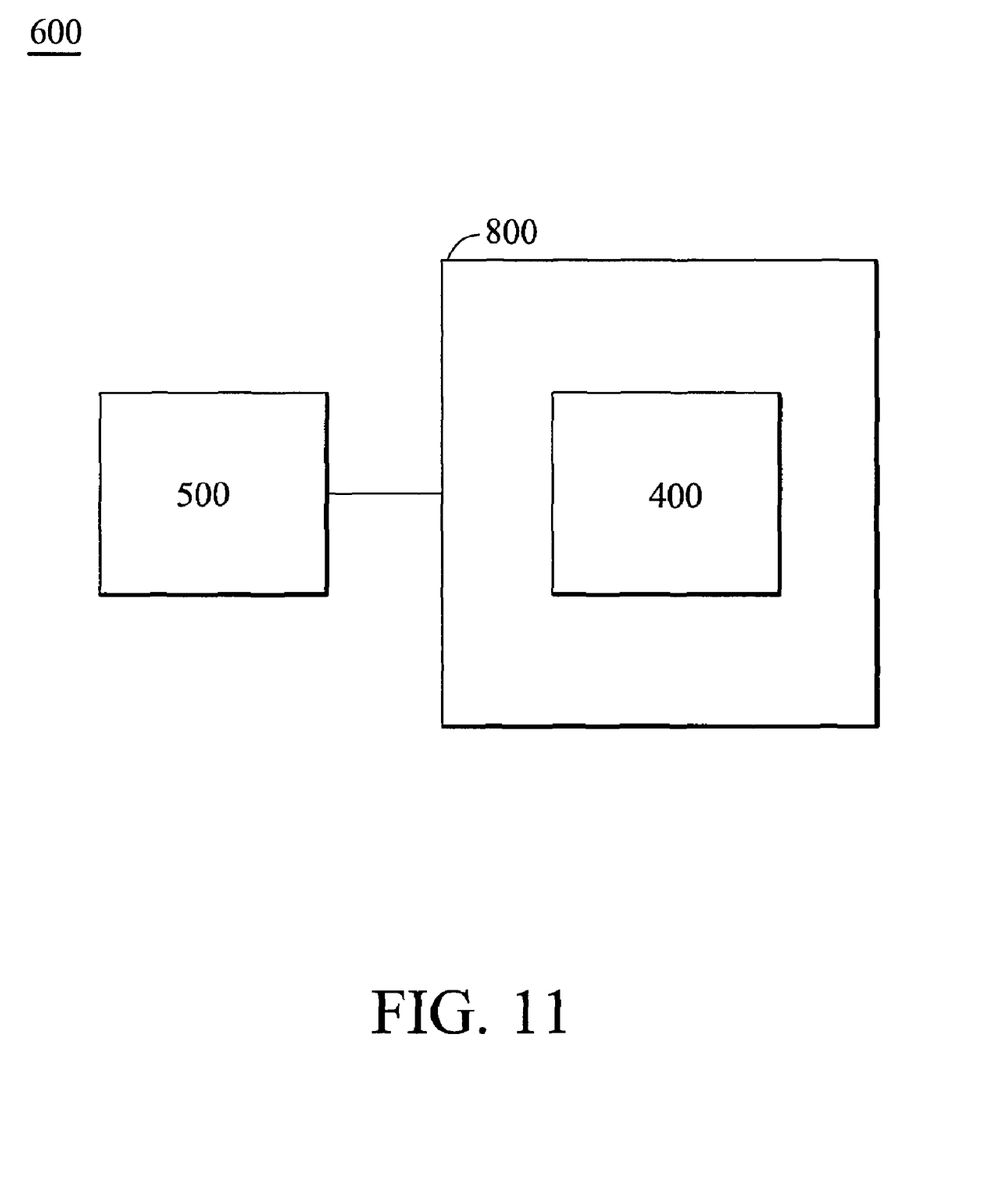
FIG. 11 schematically shows another embodiment of a system for displaying images.

FIG. 11 schematically shows another embodiment of a system for displaying images which, in this case, is implemented as a display panel 400 or an electronic device 600. The described display device can be incorporated into a display panel. As shown in FIG. 11, the display device 800 comprises a display panel, such as the liquid crystal display panel 400 shown in FIG. 4 or the liquid crystal display panel 700 shown in FIG. 7. The display device 800 can form a portion of a variety of electronic devices (in this case, electronic device 600). Generally, the electronic device 600 can comprise the display device 800 and an input unit 500. Further, the input unit 500 is operatively coupled to the display panel 400 and provides input signals (e.g., an image signal) to the display panel 400 to generate images. The electronic device 600 can be a mobile phone, digital camera, PDA (personal digital assistant), notebook computer, desktop computer, television, car display, or portable DVD player, for example.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for display images, comprising:
   a display panel, comprising:
   a first substrate and a second substrate with a liquid crystal layer interposed therebetween;
   a sealant between the first substrate and a second substrate for sealing the liquid crystal layer;
   a dielectric layer overlying the first substrate;
   metal lines overlying the dielectric layer under and/or near the sealant;
   a planarization layer covering and contacting the dielectric layer and the metal lines to form a first interface between the metal lines and the planarization layer and a second interface between the dielectric layer and the planarization layer; and
   bridge lines without contacting the planarization layer, disposed under and/or near the sealant, instead of at least a portion of the metal lines contacting the planarization layer,
   wherein bridge lines are disposed at a non-display region, the bridge lines and the metal lines are disposed at different layers with an interlayer dielectric layer therebetween, and the bridge lines and the metal lines are connected through vias in the interlayer dielectric layer.

2. The system as claimed in claim 1, wherein the first substrate comprises a region of driver ICs and the metal lines is extended thereto.

3. The system as claimed in claim 1, wherein the metal lines include a plurality of signal lines beyond an array region and a driving region.

4. The system as claimed in claim 1, the first substrate comprises an array region and scanning lines therein, the scanning lines and the bridge lines simultaneously formed by using a process.

5. The system as claimed in claim 1, wherein the first substrate comprises an array region and data lines therein, the data lines and the metal lines simultaneously formed by using a process.

6. The system as claimed in claim 1, further comprising a display device, wherein the display panel forms a portion of the display device.

7. The system as claimed in claim 6, further comprising an electronic device, wherein the electronic device comprises:
   the display device; and
   an input unit coupled to the display device and operative to provide input to the display device such that the display device displays images.

8. The system as claimed in claim 7, wherein the electronic device is a mobile phone, digital camera, PDA (personal digital assistant), notebook computer, desktop computer, television, car display, or portable DVD player.

* * * * *